(12) United States Patent
Nakai et al.

(10) Patent No.: US 7,883,805 B2
(45) Date of Patent: Feb. 8, 2011

(54) HYDROGEN GENERATING MATERIAL, HYDROGEN GENERATOR AND FUEL CELL

(75) Inventors: Toshihiro Nakai, Osaka (JP); Takeshi Miki, Osaka (JP); Shoji Saibara, Osaka (JP)

(73) Assignee: Hitachi Maxell, Ltd., Ibaraki-shi, Osaka (JP)

( * ) Notice: Subject to any disclaimer, the term of this patent is extended or adjusted under 35 U.S.C. 154(b) by 1107 days.

(21) Appl. No.: 11/597,949

(22) PCT Filed: Dec. 28, 2005

(86) PCT No.: PCT/JP2005/024082

§ 371 (c)(1),
(2), (4) Date: Nov. 28, 2006

(87) PCT Pub. No.: WO2006/073113

PCT Pub. Date: Jul. 13, 2006

(65) Prior Publication Data

US 2007/0237994 A1    Oct. 11, 2007

(30) Foreign Application Priority Data

| Jan. 7, 2005 | (JP) | 2005-001975 |
| Mar. 22, 2005 | (JP) | 2005-080850 |
| Mar. 25, 2005 | (JP) | 2005-087600 |
| Mar. 31, 2005 | (JP) | 2005-100820 |

(51) Int. Cl.
*C01B 3/08* (2006.01)
*H01M 8/06* (2006.01)
*C09K 3/00* (2006.01)

(52) U.S. Cl. ............ 429/416; 48/61; 252/182.32; 252/182.35; 423/657; 423/658

(58) Field of Classification Search ........... 423/657, 423/658, 416; 48/61; 252/182.32, 182.35
See application file for complete search history.

(56) References Cited

U.S. PATENT DOCUMENTS 3,895,102 A * 7/1975 Gallagher ............... 423/657

(Continued)

FOREIGN PATENT DOCUMENTS

EP    0417279    * 3/1991

(Continued)

OTHER PUBLICATIONS

Machine translation of JP 2004-231466A published Aug. 19, 2004.

(Continued)

*Primary Examiner*—Wayne Langel
(74) *Attorney, Agent, or Firm*—Birch, Stewart, Kolasch & Birch, LLP

(57) ABSTRACT

A hydrogen generating material reacts with water to produce hydrogen and includes at least one metal material selected from the group consisting of aluminum, magnesium, and their alloys. The metal material includes particles with a particle size of 60 μm or less in a proportion of 80 wt % or more. The hydrogen generating material can produce hydrogen easily and efficiently at low temperatures. A hydrogen generator can be made portable by using the hydrogen generating material. Moreover, the use of the hydrogen generating material as a hydrogen fuel source can reduce the size of a fuel cell and improve the electrical efficiency.

21 Claims, 1 Drawing Sheet

U.S. PATENT DOCUMENTS

| | | | |
|---|---|---|---|
| 3,942,511 A * | 3/1976 | Black et al. | 126/263.05 |
| 4,072,514 A * | 2/1978 | Susuki | 420/402 |
| 6,440,385 B1 | 8/2002 | Chaklader et al. | |
| 6,506,360 B1 * | 1/2003 | Andersen et al. | 423/657 |
| 2004/0018145 A1 | 1/2004 | Suzuki et al. | |
| 2004/0208820 A1 | 10/2004 | Watanabe et al. | |
| 2008/0317665 A1 * | 12/2008 | Troczynski et al. | 423/657 |
| 2010/0150826 A1 * | 6/2010 | Troczynski et al. | 423/657 |

FOREIGN PATENT DOCUMENTS

| | | |
|---|---|---|
| JP | 2566248 B2 | 10/1996 |
| JP | 2001-31401 A | 2/2001 |
| JP | 2003-221201 A | 8/2003 |
| JP | 2003-314792 A | 11/2003 |
| JP | 2004-505879 A | 2/2004 |
| JP | 2004-231466 A | 8/2004 |
| JP | 2005-162552 A | 6/2005 |
| JP | 2005-170780 A | 6/2005 |
| WO | WO-02/14213 A2 | 2/2002 |

OTHER PUBLICATIONS

Machine translation of JP 2003-221201 published Aug. 5, 2003.

* cited by examiner

HYDROGEN GENERATING MATERIAL, HYDROGEN GENERATOR AND FUEL CELL

TECHNICAL FIELD

The present invention relates to a hydrogen generating material including a metal material that reacts with water to produce hydrogen, a hydrogen generator using the hydrogen generating material, and a fuel cell using the hydrogen generating material as a hydrogen fuel source.

BACKGROUND ART

With the recent widespread use of cordless equipment such as a personal computer or portable telephone, secondary batteries used as a power source of the cordless equipment are increasingly required to have a smaller size and higher capacity. At present, a lithium ion secondary battery that can achieve a small size, light weight, and high energy density is being put to practical use and growing in demand as a portable power source. However, depending on the type of cordless equipment to be used, the lithium ion secondary battery is not yet reliable enough to ensure a continuous available time.

Under these circumstances, a polymer electrolyte fuel cell has been studied as an example of the battery that may meet the above requirements. The polymer electrolyte fuel cell uses a polymer electrolyte membrane as an electrolyte, oxygen in the air as a positive active material, and a fuel (hydrogen, methanol, etc.) as a negative active material, and has attracted considerable attention because it is a battery system that can be expected to have a higher energy density than the lithium ion secondary battery. Fuel cells can be used continuously as long as a fuel and oxygen are supplied. Although there are several candidates for fuels used for the fuel cells, the individual fuels have various problems, and the final decision has not been made yet.

A direct methanol fuel cell (DMFC) is miniaturized easily and expected to be a future portable power source. In the DMFC, methanol is used as a fuel and reacts directly at the electrode. However, the DMFC causes a reduction in voltage due to a crossover phenomenon in which methanol at the negative electrode passes through the solid electrolyte and reaches the positive electrode. Therefore, the DMFC still does not have the expected energy density.

When hydrogen is used as a fuel, e.g., a method for supplying hydrogen stored in a high-pressure tank or hydrogen-storing alloy tank is employed to some extent. However, a fuel cell using such a tank is not suitable for a portable power source, since both the volume and the weight of the fuel cell are increased, and the energy density is reduced. There is also another method for extracting hydrogen by reforming a hydrocarbon fuel. However, a fuel cell using the hydrocarbon fuel requires a reformer and thus poses problems such as the supply of heat to the reformer and the thermal insulation. Therefore, this fuel cell is not suitable for a portable power source either.

Under these circumstances, a method has been proposed that produces hydrogen with a chemical reaction at a low temperature of 100° C. or less and uses the hydrogen as a fuel. For example, a metal that reacts with water to produce hydrogen such as aluminum, magnesium, silicon, or zinc is used as a hydrogen source (see the following Patent Documents 1 to 5).

Patent Document 1: U.S. Pat. No. 6,506,360
Patent Document 2: JP 1(1989)-61301 A (U.S. Pat. No. 2,566,248)
Patent Document 3: JP 2004-231466 A
Patent Document 4: JP 2001-31401 A
Patent Document 5: JP 2004-505879 A Patent Documents 1 to 3 disclose methods including the reaction of aluminum and an alkali or acid. Although it may be easy for these methods to produce hydrogen chemically, the equivalent weight of the alkali or acid corresponding to aluminum needs to be added, which in turn reduces the energy density because of a large proportion of the material other than the hydrogen source. Moreover, the reaction product (oxide or hydroxide) forms a film on the surface of the metal, so that water cannot come into contact with the inside of the metal. This may lead to a problem that the oxidation reaction stops only at the surface of the metal. In particular, it is difficult for the method of Patent Document 3, in which heat of the reaction between calcium oxide and water is utilized in the hydrogen producing reaction of aluminum, to generate hydrogen if the content of the calcium oxide is less than 15 wt %. In Patent Document 3, therefore, the proportion of aluminum in the hydrogen generating material is 85 wt % or less.

Patent Document 4 is intended to avoid the above problem by removing the film mechanically from the metal surface. However, the device should have mechanical equipment for removal of the film and becomes larger. In Patent Document 5, alumina is added as a catalyst to suppress the formation of the hydroxide film, and hydrogen is generated at a low temperature of 50° C. However, the addition of a certain amount of catalyst can reduce the content of aluminum in the hydrogen generating material.

DISCLOSURE OF INVENTION

A hydrogen generating material of the present invention reacts with water to produce hydrogen and includes at least one metal material selected from the group consisting of aluminum, magnesium, and their alloys. The metal material includes particles with a particle size of 60 μm or less in a proportion of 80 wt % or more.

A hydrogen generator of the present invention includes a vessel having at least an outlet through which hydrogen is discharged. The hydrogen generating material of the present invention is placed in the vessel, and water is supplied to the hydrogen generating material to produce hydrogen.

A fuel cell of the present invention includes the hydrogen generating material of the present invention as a hydrogen fuel source.

The hydrogen generating material of the present invention can produce hydrogen easily and efficiently at low temperatures. A hydrogen generator can be made portable by using the hydrogen generating material of the present invention. Moreover, the use of the hydrogen generating material of the present invention as a hydrogen fuel source can reduce the size of a fuel cell and improve the electrical efficiency.

BEST MODE FOR CARRYING OUT THE INVENTION

Figure 1:
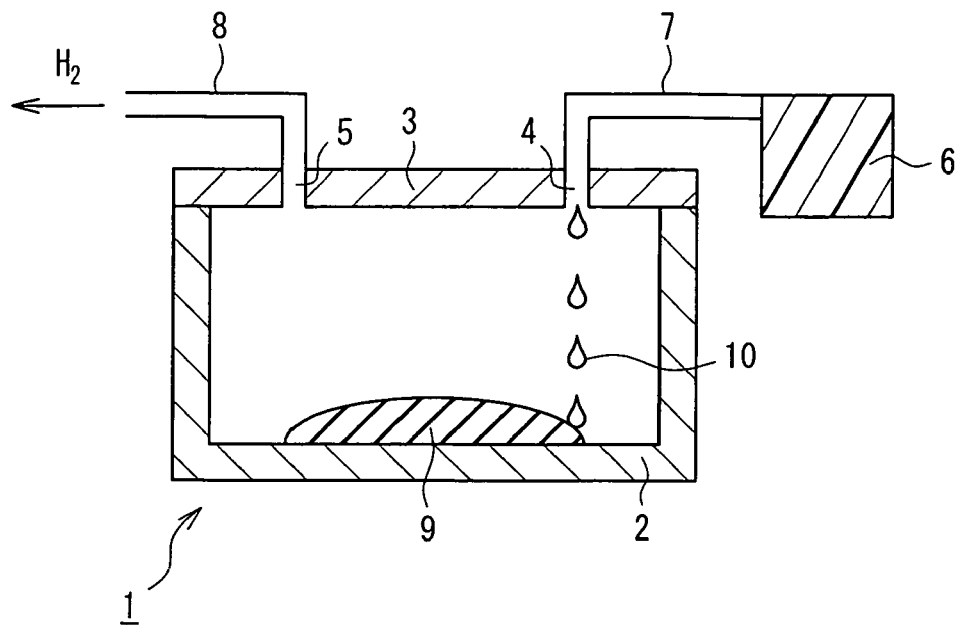
FIG. 1 is a schematic cross-sectional view showing an example of a hydrogen generator of the present invention.

Hereinafter, embodiments of the present invention will be described in detail.

Embodiment 1

First, an embodiment of a hydrogen generating material of the present invention will be described. The hydrogen generating material of the present invention reacts with water to produce hydrogen and includes at least one metal material selected from aluminum, magnesium, and their alloys.

When the hydrogen generating material comes into contact with water, the metal material included in the hydrogen generating material and the water can react to produce hydrogen.

The metal material generally forms a stable oxide film on the surface, and therefore the reaction with water hardly proceeds in the bulk state such as a plate or block. Even if the metal material is heated, it is unlikely to be a hydrogen gas source. However, the metal material in the form of fine particles can react with water to produce hydrogen, and the reaction accelerates particularly by heating. Thus, the metal material in the form of fine particles can be used as an excellent hydrogen source. On the other hand, when the metal material does not react with water, the handling of the metal material in the air is relatively easy due to the presence of the oxide film.

For example, when the metal material is aluminum, the reaction with water to produce hydrogen and an oxidation product may be expressed as any one of the following formulas.

$$2Al + 6H_2O \rightarrow Al_2O_3 \cdot 3H_2O + 3H_2 \tag{1}$$

$$2Al + 4H_2O \rightarrow Al_2O_3 \cdot H_2O + 3H_2 \tag{2}$$

$$2Al + 3H_2O \rightarrow Al_2O_3 + 3H_2 \tag{3}$$

In the above reaction, aluminum is stabilized by forming an oxide film on the surface. However, since the reaction is an exothermic reaction, the reaction temperature is raised so that the reaction of aluminum and water occurs readily, thus continuing the hydrogen producing reaction. In this case, if aluminum has an excessively large particle size, the reaction may not continue. Therefore, it is desirable that the particle size of aluminum be as small as possible to increase the reaction area. The same is true for an aluminum alloy, magnesium, and a magnesium alloy.

Although the compositions or the like of the aluminum alloy and the magnesium alloy are not particularly limited, it is desirable that the content of aluminum or magnesium that relates to the hydrogen generation be larger. Specifically, the content of aluminum or magnesium is preferably 80 wt % or more, and more preferably 85 wt % or more. That is, the content of the additional element is preferably 20 wt % or less, and more preferably 15 wt % or less. Depending on the type of the additional element, the content is preferably 2 wt % or more so that the effect of the additional element is exerted sufficiently.

Examples of the additional element in the aluminum alloy include silicon, iron, copper, manganese, magnesium, zinc, nickel, titanium, lead, tin, and chromium. These elements may be used in combination of two or more. Among them, silicon, magnesium, and copper are preferred particularly. The contents of silicon, magnesium, and copper may be 4 to 13 wt %, 2 to 10 wt %, and 3 to 6 wt %, respectively. However, when two or more of these elements are added, it is recommended that the total amount of the additional elements including at least two elements selected from silicon, magnesium, and copper should be adjusted to satisfy the appropriate value of 20 wt % or less. The aluminum alloy with this composition can have hardness (e.g., 55 to 95 HB in Brinell hardness) that is higher than pure aluminum and is suitable for treatment to remove the oxide film from the surface, as will be described later. Moreover, the aluminum alloy can improve the reactivity with water, and thus is expected to increase the amount of hydrogen generated.

Examples of the additional element in the magnesium alloy include aluminum, zinc, zirconium, silicon, iron, copper, manganese, nickel, and a rare-earth element. These elements may be used in combination of two or more. In particular, the magnesium alloy preferably includes at least one element selected from aluminum, zinc, and zirconium. The preferred range of the content depends on the type of the additional element, and aluminum, zinc, and zirconium may be 4 to 12 wt %, 1 to 8 wt %, and 0.2 to 4 wt %, respectively. However, when two or more of these elements are added, it is recommended that the total amount of the additional elements including at least two elements selected from aluminum, zinc, and zirconium should be adjusted to satisfy the appropriate value of 20 wt % or less. Like the aluminum alloy, the magnesium alloy with this composition can be harder (e.g., 55 to 95 HB in Brinell hardness), and also is expected to increase the amount of hydrogen generated.

There is no particular limitation to the manufacturing method or shape of the metal material. The metal material may be produced, e.g., by a mechanical powdering or atomizing method in a variety of shapes such as scale, substantially sphere, fusiform, and droplet. In particular, the metal material produced by a rapid solidification process like the atomizing method is used preferably. With the rapid solidification process, crystal grains in the metal material become finer, and the grain boundary that is to be an active site is increased. Therefore, the reaction of the metal material and water may proceed easily. Moreover, the metal material produced by the rapid solidification process has relatively high wettability and may be likely to react with water.

In the atomizing method, molten metal is fed as a narrow flow, and a shearing force is applied to the molten metal flow with an atomizer using a gas or spinning disk, so that the molten metal flow is dispersed in the form of powder. A dispersion medium for the gas may be air or inert gas such as nitrogen or argon. When solution particles dispersed in the dispersion medium are cooled rapidly by spraying a liquid or gas, the solution particles are coagulated to form metal powder. The liquid or gas used as a cooling medium may be, e.g., water, liquid nitrogen, air, nitrogen, or argon.

When the metal material is produced by the mechanical powdering method, a lubricant is used in a dry process. The lubricant covers the surface of the metal material and reduces the wettability of the metal material with water. Therefore, even if the metal material is in the form of fine particles, the reaction may not proceed easily. In such a case, the wettability can be enhanced by surface treatment, which will be described later.

The form of the metal material used in the present invention specifically is as follows. In order for the metal material to react with water efficiently at low temperatures, the particle size is preferably 100 μm or less, and more preferably 50 μm or less. In particular, for the purpose of producing hydrogen under the mild conditions of about 40° C., the optimum metal material includes particles with a particle size of 60 μm or less in a proportion of 80 wt % or more, preferably 90 wt % or more, and further preferably 100 wt %.

To improve the reaction efficiency further, the average particle size of the metal material is preferably 30 μm or less, and more preferably 20 μm or less.

The hydrogen generation rate increases as the particle size of the metal material decreases. However, if the particle size is smaller than 0.1 μm, it is difficult to handle the particles because their stability in the air is lower. Moreover, the bulk density is reduced to reduce the packing density of the hydrogen generating material. Therefore, it is desirable that the particle size of the metal material be 0.1 µm or more.

In this specification, the particle size of the metal material is measured, in principle, by a laser diffraction scattering method. Specifically, the measuring object is dispersed in a liquid phase such as water and irradiated with a laser beam to detect scattering intensity distribution, and the particle size distribution is measured using this scattering intensity distribution. The measuring device may be, e.g., "Microtrac HRA" (particle size analyzer, manufactured by Nikkiso Co., Ltd.). For more convenience, the metal material having a desired particle size can be obtained by classification with a sieve. For example, when the metal material is classified with a 50 µm mesh sieve, the resultant powder has a particle size of 50 µm or less. In this specification, the average particle size means a diameter of particles with an accumulated volume percentage of 50%, i.e., $d_{50}$.

It is desirable that the hydrogen generating material include a heat generating material that generates heat by reacting with water at room temperature along with the metal material so that the metal material is warmed at 40° C. or more. In this specification, the room temperature is 25° C. As described above, the metal material having a small particle size is likely to be mixed uniformly with the heat generating material, and thus more favorable result may be obtained.

It is desirable that the metal material and the heat generating material be mixed so that only the metal material is not formed into a lump of 1 mm or more. This can avoid interfering with the reaction between the metal material and water.

When the metal material with the above particle size and the heat generating material are mixed uniformly, the whole metal material is heated and reacts efficiently with water to produce hydrogen. Therefore, the metal material that serves as a hydrogen source can be increased while reducing the proportion of the heat generating material in the hydrogen generating material. On the other hand, if the metal material is in the form of fine particles and mixed with a large proportion of the heat generating material, the reaction proceeds very rapidly and heat is generated vigorously. Thus, there is a risk that the hydrogen producing reaction may not be controlled. In view of this, the proportion of the heat generating material to the whole hydrogen generating material is preferably not more than 20 wt %, and more preferably less than 15 wt %.

If the hydrogen generating material includes no heat generating material, the hydrogen producing reaction does not start or takes a considerable time to start at low temperatures near the room temperature. Therefore, it is desirable that at least 1 wt % heat generating material be included in the hydrogen generating material. When the hydrogen generating material does not include the heat generating material, it may be heated externally to promote the reaction.

In the hydrogen generating material of the present invention, the proportion of the metal material to the total weight of the metal material and the heat generating material is preferably more than 85 wt % and not more than 99 wt %. This can produce a larger amount of hydrogen.

The reaction temperature and the hydrogen generation rate may be controlled to some extent by the content of the heat generating material. However, if the reaction temperature is too high, the hydrogen producing reaction proceeds rapidly and cannot be controlled. Therefore, it is desirable to adjust the amount of the heat generating material added so that the reaction temperature is 120° C. or less. Moreover, to prevent evaporation of water to be used for the reaction, it is more desirable to adjust the amount of the heat generating material added so that the reaction temperature is 100° C. or less. In terms of efficiency of the hydrogen producing reaction, the reaction temperature is preferably 40° C. or more.

The heat generating material that generates heat by reacting with water may be, e.g., an oxide, a chloride, a sulfide, etc. of alkali metals or alkaline-earth metals that react with water to form a hydroxide or generate heat by hydration, such as calcium oxide, magnesium oxide, calcium chloride, magnesium chloride, or calcium sulfate. In particular, calcium oxide is most preferred because it is inexpensive and the amount of heat generated per unit weight is large.

A material that generates heat by reacting with oxygen such as iron powder also has been known as the heat generating material. For this type of heat generating material, however, oxygen needs to be introduced during the reaction. Therefore, when the metal material and the heat generating material are placed in the same reactor, as in the case of a hydrogen generator of the present invention (which will be described later), the following problem is likely to occur: the purity of hydrogen generated is reduced, or the amount of hydrogen generated is reduced due to oxidation of the metal material that serves as a hydrogen source. Thus, the above material that generates heat by reacting with water is used suitably for the heat generating material of the present invention.

The metal material and the heat generating material are mixed and used as the hydrogen generating material. Alternatively, the hydrogen generating material can be a composite material obtained by coating the surface of the metal material with the heat generating material.

Although the metal material may be used as it is, the metal material preferably is subjected to surface treatment before mixing with the heat generating material, thereby increasing the hydrogen generation rate. The surface treatment improves the surface reactivity of the metal material by removing a film (e.g., oxide film) that may interfere with the reaction from the surface of the metal material, or corroding the surface of the metal material to enhance the hydrophilicity. A specific means for the surface treatment is not particularly limited. For example, there is a mechanical means for stirring the metal material mechanically in an inert gas atmosphere, or in an organic solvent such as toluene, ethanol, or acetone, or a solvent such as water. There is also a chemical means for dissolving the surface of the metal material with an alkaline aqueous solution. Examples of the alkaline aqueous solution include aqueous solutions of sodium hydroxide, potassium hydroxide, and ammonia. The alkaline aqueous solution may have a pH of about 9 to 14. It is desirable that the surface-treated metal material be mixed with the heat generating material in the inert gas atmosphere so as to prevent the surface from being oxidized again.

The shape of the hydrogen generating material of the present invention is not particularly limited. For example, the hydrogen generating material may be press-formed into pellets or granulated into granules to increase the packing density.

A reaction accelerator such as alumina, silica, magnesia, zinc oxide, carbon, or water-absorbing polymer may be added to the hydrogen generating material of the present invention. The addition of the reaction accelerator is considered to have the effect of making good contact between the metal material and water or facilitating the penetration of water into pellets when the hydrogen generating material is in the form of pellets.

Embodiment 2

Next, an embodiment of a hydrogen generator of the present invention will be described. The hydrogen generator of the present invention includes a vessel having at least an outlet through which hydrogen flows. The hydrogen generating material of Embodiment 1 is placed in the vessel, and water is supplied to the hydrogen generating material to produce hydrogen.

By using the hydrogen generating material of Embodiment 1, hydrogen can be produced easily and efficiently at low temperatures, and the hydrogen generator can be made portable.

The hydrogen generating material reacts with water in the vessel and can produce hydrogen that serves as a fuel source of a fuel cell, which will be described later. In this case, the amount of hydrogen generated can be controlled by controlling the supply of water to the hydrogen generating material.

The material or shape of the vessel is not particularly limited, as long as the vessel can hold the hydrogen generating material. The suitable material for the vessel is substantially impermeable to water and hydrogen and does not cause any failure of the vessel even if it is heated at about 100° C. For example, metals such as aluminum and iron, resins such as polyethylene and polypropylene, or heat-resistant glass can be used appropriately. Moreover, a means for supplying water to the vessel is not particularly limited. When water is supplied from outside the vessel, a water inlet may be provided in the vessel and connected to a pump or the like, thereby allowing water to flow into the vessel.

The vessel containing the hydrogen generating material, i.e., the hydrogen generator may be formed as a cartridge that is detachable from the main body of electronic equipment or the fuel cell body. In such a case, for the convenience of portability, the vessel may have a storage portion for storing water inside the vessel, and water may be supplied from the storage portion to the hydrogen generating material. This configuration can remove the water inlet and the pump or the like, so that the hydrogen generator can be configured simply by providing the vessel with at least a hydrogen outlet. Therefore, compared to the device in which water is supplied from outside the vessel, the hydrogen generator can be simplified and miniaturized easily, and thus is more suitable for a portable fuel source. The storage portion may be formed, e.g., by sealing water in a bag made of a polyethylene film or the like. The water inside the bag is brought into contact with the hydrogen generating material in such a simple manner that the bag is perforated. Consequently, hydrogen can be produced in the vessel that functions as a hydrogen generator.

The hydrogen generator of the present invention will be described with reference to the drawing. FIG. 1 is a schematic cross-sectional view showing an example of the hydrogen generator of the present invention. In FIG. 1, the hydrogen generator 1 includes a vessel 2 and a lid 3, and the lid 3 has an inlet 4 through which water is supplied and an outlet 5 through which hydrogen is discharged. The inlet 4 and a tubular pump 6 are connected by a supply pipe 7. A discharge pipe 8 is connected to the outlet 5. The hydrogen generating material 9 of Embodiment 1 is placed in the vessel 2. While water 10 is supplied continuously to the hydrogen generator 1 with the tubular pump 6, the hydrogen generating material 9 and the water 10 react to produce hydrogen. This hydrogen ($H_2$) is drawn from the discharge pipe 8 connected to the outlet 5 and can be used as a hydrogen source of a fuel cell, which will be described later.

Embodiment 3

Next, an embodiment of a fuel cell of the present invention will be described. The fuel cell of the present invention includes the hydrogen generating material of Embodiment 1 as a hydrogen fuel source. This can reduce the size of the fuel cell and improve the electrical efficiency.

Hydrogen generated by the reaction of the hydrogen generating material of Embodiment 1 includes neither CO nor $CO_2$, which have been a problem of hydrogen produced by reforming a hydrocarbon fuel. Therefore, even if the hydrogen is applied to a polymer electrolyte fuel cell that operates at 100° C. or less, the fuel cell is not affected by poisoning due to the above gas. Moreover, since the hydrogen producing reaction involves water, the hydrogen gas generated includes a moderate amount of moisture and is very useful for the hydrogen source of the fuel cell that uses hydrogen as a fuel.

The fuel cell of the present invention may receive hydrogen from the hydrogen generator of Embodiment 2. This can make the fuel cell portable.

Figure 2:
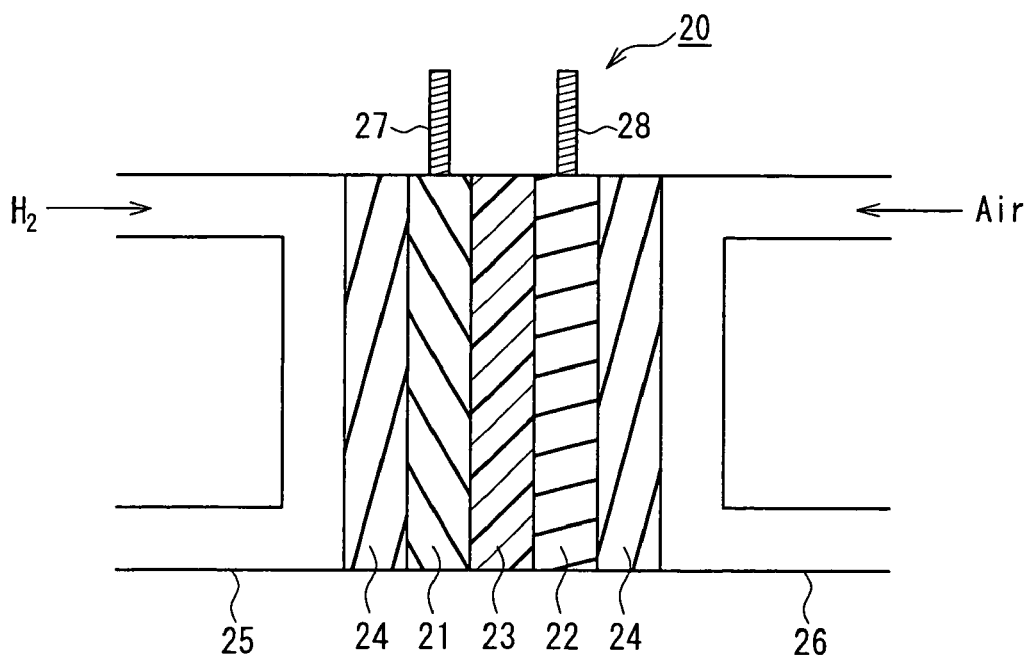
FIG. 2 is a schematic cross-sectional view showing an example of a fuel cell of the present invention.

The fuel cell of the present invention will be described with reference to the drawing. FIG. 2 is a schematic cross-sectional view showing an example of the fuel cell of the present invention. The fuel cell 20 includes a membrane electrode assembly that includes a positive electrode 22 for reducing oxygen, a negative electrode 21 for oxidizing hydrogen, and a solid electrolyte 23 located between the positive electrode 22 and the negative electrode 21. The fuel cell 20 can operate continuously, e.g., by supplying hydrogen from the hydrogen generator (not shown in FIG. 2) of Embodiment 2.

A diffusion layer 24 is arranged on the outside of each of the positive electrode 22 and the negative electrode 21. The diffusion layer 24 may be, e.g., a porous carbon material. A positive separator 26 is located on the side of the positive electrode 22 for supplying air (oxygen). A negative separator 25 is located on the side of the negative electrode 21 for supplying hydrogen. The negative separator 25 communicates with, e.g., the hydrogen generator (not shown in FIG. 2) of Embodiment 2. The positive electrode 22 has a positive terminal 28, and the negative electrode 21 has a negative terminal 27.

The fuel cell 20 is not limited particularly by its size, shape, or material other than the hydrogen generator of Embodiment 2 and the hydrogen generating material of Embodiment 1 used in the hydrogen generator.

Hereinafter, the present invention will be described by way of examples.

Working Example 1

Aluminum powder (the proportion of particles with a particle size of 60 μm or less: 100 wt %) having an average particle size of 3 μm was produced by a gas atomizing method and used as a metal material. Calcium oxide powder was used as a heat generating material. The aluminum powder and the calcium oxide powder were mixed in a mortar at a ratio as shown in Table 1, thereby producing a hydrogen generating material. Then, 1 g of the hydrogen generating material was put in a sampling bottle, to which 4 g of water was added and allowed to stand for 48 hours. Hydrogen generated during this period of time was collected by a water-displacement method. The test was conducted at the temperature of a room (24 to 26° C.), and the volume of the collected hydrogen was measured as the amount of hydrogen generated. Table 1 shows the results. The maximum reaction temperature of the hydrogen generating material including 1 wt % heat generating material was 89° C. during the test.

TABLE 1

| Metal material | | | Content (wt %) | | |
|---|---|---|---|---|---|
| Type | Average particle size (µm) | Heat generating material | Metal material | Heat generating material | Amount of hydrogen generated (mL) |
| Working Example 1 | Aluminum | 3 | Calcium oxide | 99 | 1 | 886 |
| | | | | 97 | 3 | 930 |
| | | | | 95 | 5 | 922 |
| | | | | 90 | 10 | 948 |
| | | | | 85 | 15 | 827 |
| | | | | 80 | 20 | 517 |
| | | | | 70 | 30 | 439 |

Working Example 2

A hydrogen generating material was produced in the same manner as Working Example 1 except that aluminum powder (the proportion of particles with a particle size of 60 µm or less: 100 wt %) having an average particle size of 30 µm was mixed at a ratio as shown in Table 2, instead of the aluminum powder having an average particle size of 3 µm. Subsequently, the amount of hydrogen generated was measured in the same manner as Working Example 1. Table 2 shows the results.

Working Example 3

A hydrogen generating material was produced in the same manner as Working Example 2 except that calcium chloride powder was mixed at a ratio as shown in Table 2, instead of the calcium oxide powder. Subsequently, the amount of hydrogen generated was measured in the same manner as Working Example 1. Table 2 shows the result.

Working Example 4

A hydrogen generating material was produced in the same manner as Working Example 1 except that magnesium powder with a particle size of 45 µm or less obtained by sieving was mixed at a ratio as shown in Table 2, instead of the aluminum powder having an average particle size of 3 µm. Subsequently, the amount of hydrogen generated was measured in the same manner as Working Example 1. Table 2 shows the result.

Comparative Example 1

A hydrogen generating material was produced in the same manner as Working Example 1 except that aluminum powder (the proportion of particles with a particle size of 60 µm or less: 16 wt %) having an average particle size of 150 µm was mixed at a ratio as shown in Table 2, instead of the aluminum powder having an average particle size of 3 µm. Subsequently, the amount of hydrogen generated was measured in the same manner as Working Example 1. Table 2 shows the result.

Comparative Example 2

A hydrogen generating material was produced in the same manner as Working Example 1 except that magnesium powder (the proportion of particles with a particle size of 60 µm or less: 12 wt %) having an average particle size of 150 µm was mixed at a ratio as shown in Table 2, instead of the aluminum powder having an average particle size of 3 µm. Subsequently, the amount of hydrogen generated was measured in the same manner as Working Example 1. Table 2 shows the result.

Comparative Example 3

A hydrogen generating material was produced in the same manner as Working Example 1 except that silicon powder having an average particle size of 5 µm was mixed at a ratio as shown in Table 2, instead of the aluminum powder having an average particle size of 3 µm. Subsequently, the amount of hydrogen generated was measured in the same manner as Working Example 1. Table 2 shows the result.

Comparative Example 4

A hydrogen generating material was produced in the same manner as Working Example 1 except that zinc powder having an average particle size of 7 µm was mixed at a ratio as shown in Table 2, instead of the aluminum powder having an average particle size of 3 µm. Subsequently, the amount of hydrogen generated was measured in the same manner as Working Example 1. Table 2 shows the result.

TABLE 2

| Metal material | | | Content (wt %) | | |
|---|---|---|---|---|---|
| Type | Average particle size (µm) | Heat generating material | Metal material | Heat generating material | Amount of hydrogen generated (mL) |
| Working Example 2 | Aluminum | 30 | Calcium oxide | 95 | 5 | 576 |
| | | | | 85 | 15 | 681 |
| | | | | 80 | 20 | 305 |
| | | | | 70 | 30 | 280 |
| Working Example 3 | Aluminum | 30 | Calcium chloride | 95 | 5 | 452 |
| Working Example 4 | Magnesium | ≦45 | Calcium oxide | 95 | 5 | 152 |
| Comparative Example 1 | Aluminum | 150 | Calcium oxide | 95 | 5 | 321 |
| Comparative Example 2 | Magnesium | 150 | | | | 3 |
| Comparative Example 3 | Silicon | 5 | | | | 86 |
| Comparative Example 4 | Zinc | 7 | | | | 72 |

In Working Examples 1 to 4, the particle size of the metal material in the hydrogen generating material is reduced, and the proportion of the particles with a particle size of 60 µm or less is 80 wt % or more. When comparisons are made between the hydrogen generating materials including the same metal material, the amount of hydrogen generated is larger in Working Examples 1 to 4 than in Comparative Example 1 or 2 that uses the metal material having a large particle size. Accordingly, the hydrogen generating materials of Working Examples 1 to 4 can improve the reaction efficiency. Therefore, even if the proportion of the heat generating material is decreased to less than 15 wt %, the reaction of the metal material and water can be continued. This makes it clear that the reaction efficiency is improved as the proportion of the heat generating material becomes lower.

In particular, Working Example 1 in which the metal material has an average particle size of 3 μm can produce a hydrogen gas corresponding to about 70% of the theoretical value (Al: about 1.3 L per 1 g) of the hydrogen generation, although the proportion of the heat generating material is as low as 1 wt %. Moreover, even under the mild conditions of 100° C. or less, the hydrogen producing reaction can proceed efficiently.

In both Comparative Example 3 using silicon as the metal material and Comparative Example 4 using zinc as the metal material, the amount of hydrogen generated is small, although the metal material includes fine particles having an average particle size of 10 μm or less. This makes it clear that aluminum or magnesium is more suitable than the others for the metal material that serves as a hydrogen source.

The hydrogen generating material of Comparative Example 1 can produce a hydrogen gas to some extent, although the aluminum powder includes only 16 wt % particles with a particle size of 60 μm or less. This is attributed to an increase in reactivity with water because the aluminum powder is formed by the gas atomizing method.

Working Example 5

A hydrogen generating material was produced in the same manner as Working Example 1 except that the aluminum powder and the calcium oxide powder were mixed at a ratio as shown in Table 3. Then, 1 g of the hydrogen generating material was press-formed at a pressure of 40 MPa into pellets having a diameter of 12 mm. Using these pellets, the amount of hydrogen generated was measured in the same manner as Working Example 1. Table 3 shows the result.

Working Example 6

A hydrogen generating material was produced in the same manner as Working Example 1 except that the aluminum powder, the calcium oxide powder, and alumina having an average particle size of 1 μm were mixed at a ratio as shown in Table 3. Then, the hydrogen generating material was formed into pellets in the same manner as Working Example 5. Using these pellets, the amount of hydrogen generated was measured in the same manner as Working Example 1. Table 3 shows the result.

TABLE 3

| | Content (wt %) | | | Shape of hydrogen generating material | Amount of hydrogen generated (mL) |
| --- | --- | --- | --- | --- | --- |
| | Aluminum | Calcium oxide | Alumina | | |
| Working Example 5 | 85 | 15 | — | Pellet | 190 |
| Working Example 6 | 81 | 14 | 5 | Pellet | 276 |

The results of Working Examples 5, 6 confirmed that the hydrogen generating material of the present invention brings about a hydrogen producing reaction even in the form of pellets. It was also confirmed that the addition of alumina improves the reaction efficiency.

Working Example 7

1 g of the hydrogen generating material including only aluminum powder used in Working Example 1 and 2 g of water were put in a sampling bottle. A heating resistor was located outside the sampling bottle. The sampling bottle was heated at various temperatures by allowing electricity to pass through the resistor, so that the hydrogen generating material reacted with water. Hydrogen thus generated was collected by water substitution. The amount of hydrogen generated and the generation rate were measured over 20 hours from the beginning of the experiment. Table 4 shows the amount of hydrogen generated (total amount) and the maximum generation rate during this period of time. In Table 4, "non-heating" indicates that the measurement was performed at the temperature of a room (24 to 26° C.) while no electricity passed though the resistor.

TABLE 4

| | Heating temperature (° C.) | Amount of hydrogen generated (mL) | Maximum generation rate (mL/min) |
| --- | --- | --- | --- |
| Working Example 7 | non-heating | 0 | 0 |
| | 30 | 24 | <1 |
| | 40 | 968 | 3 |
| | 45 | 974 | 9 |
| | 50 | 1061 | 19 |

In Working Example 7, when heating stopped and the hydrogen generating material and water were cooled, the hydrogen generation stopped after several minutes. Moreover, no hydrogen was generated without heating.

Working Example 8

The amount of hydrogen generated and the generation rate were measured in the same manner as Working Example 7 except that aluminum powder having various average particle sizes as shown in Table 5 was used, 10 g of water was added, and the heating temperature was 50° C. Table 5 shows the results.

Comparative Example 5

The amount of hydrogen generated and the generation rate were measured in the same manner as Working Example 8 except that the aluminum powder of Comparative Example 1 was used instead of the aluminum powder of Working Example 1. Table 5 shows the result.

Comparative Example 6

The amount of hydrogen generated and the generation rate were measured in the same manner as Working Example 8 except that aluminum powder (the proportion of particles with a particle size of 60 μm or less: 70 wt %) having an average particle size of 55 μm was used instead of the aluminum powder of Working Example 1. Table 5 shows the result.

Working Example 9

The aluminum powder having an average particle size of 55 μm used in Comparative Example 6 was screened with a 250-mesh sieve. The aluminum powder that passed through the sieve included 87 wt % particles with a particle size of 60 μm or less. The amount of hydrogen generated and the generation rate were measured in the same manner as Working Example 8 except that the aluminum powder that passed through the sieve was used instead of the aluminum powder of Working Example 1. Table 5 shows the result.

TABLE 5

| | Heating temperature (° C.) | Average particle size (μm) | Proportion of particles of 60 μm or less (wt %) | Amount of hydrogen generated (mL) | Maximum generation rate (mL/min) |
|---|---|---|---|---|---|
| Working Example 8 | 50 | 3 | 100 | 1027 | 12 |
| | | 20 | 100 | 921 | 5 |
| | | 30 | 100 | 631 | 3 |
| Working Example 9 | 50 | <55 | 87 | 535 | 2 |
| Comparative Example 5 | 50 | 150 | 16 | 365 | 1 |
| Comparative Example 6 | 50 | 55 | 70 | 375 | 2 |

As shown in Table 4, the metal material included in the hydrogen generating material of the present invention is not likely to react with water at 30° C. or less. Therefore, when the hydrogen generating material does not include a heat generating material, it is desirable that the reaction start with external heating or the like. In such a case, since the reaction proceeds under the mild conditions of about 40° C., heating at a temperature of at least 40° C. can provide sufficient reaction efficiency. Therefore, the hydrogen generating material can produce hydrogen even with a simple heating facility, and thus is suitable for a hydrogen source of a small fuel cell that requires a small compact fuel source.

As is evident from the results of Table 5, even if the heat generating material is not present, the hydrogen producing reaction can be likely to occur by using only small particles obtained by screening as the metal material. In particular, when the average particle size is 20 μm or less, the reaction efficiency can be improved significantly.

Working Example 10

An aluminum alloy "ADC6" (composition: Al content: 97 wt %, Mg content: 2.5 wt %, form: cutting chips, Brinell hardness: 67 HB) based on the Japan Industrial Standard (JIS) was subjected to surface treatment that removes the oxide film from the surface while mechanically stirring the aluminum alloy in water, thus resulting in aluminum alloy powder (the proportion of particles with a particle size of 60 μm or less: 100 wt %) having an average particle size of 10 μm. This metal material and calcium oxide were mixed in a mortar at a ratio as shown in Table 6, thereby producing a hydrogen generating material. The amount of hydrogen generated was measured in the same manner as Working Example 1 except for the use of the above hydrogen generating material. Table 6 shows the results. The maximum reaction temperature of the hydrogen generating material including 1 wt % heat generating material was 87° C. during the test.

Working Example 11

A hydrogen generating material was produced in the same manner as Working Example 10 except that the aluminum alloy powder having an average particle size of 50 μm (the proportion of particles with a particle size of 60 μm or less: 82 wt %) was mixed with calcium oxide at a ratio as shown in Table 6. Subsequently, the amount of hydrogen generated was measured in the same manner as Working Example 1. Table 6 shows the results.

Working Example 12

Instead of the aluminum alloy "ADC6", the following aluminum alloys based on the JIS were used: "ADC3" (composition: Al content: 88 wt %, Si content: 10 wt %, Mg content: 0.5 wt %, form: cutting chip, Brinell hardness: 76 HB); "ADC1" (composition: Al content: 85 wt %, Si content: 12 wt %, form: cutting chips, Brinell hardness: 72 HB); and "AC4B" (composition: Al content: 80 wt %, Si content: 10 wt %, Cu content: 4 wt %, form: cutting chips, Brinell hardness: 80 HB). Three types of hydrogen generating materials were produced in the same manner as Working Example 11 except that each of the above metal materials was mixed with calcium oxide at a ratio as shown in Table 6. Subsequently, the amount of hydrogen generated was measured in the same manner as Working Example 1. Table 6 shows the results.

TABLE 6

| | Metal material | | | Content (wt %) | | Amount of hydrogen generated (mL) |
|---|---|---|---|---|---|---|
| | Material (JIS) | Average particle size (μm) | Al content (wt %) | Metal material | Calcium oxide | |
| Working Example 10 | ADC6 | 10 | 97 | 99 | 1 | 899 |
| | | | | 97 | 3 | 944 |
| | | | | 95 | 5 | 935 |
| | | | | 90 | 10 | 962 |
| | | | | 86 | 14 | 837 |
| | | | | 80 | 20 | 520 |
| | | | | 70 | 30 | 454 |
| Working Example 11 | ADC6 | 50 | 97 | 95 | 5 | 654 |
| | | | | 86 | 14 | 700 |
| | | | | 80 | 20 | 327 |
| | | | | 70 | 30 | 301 |
| Working Example 12 | ADC3 | 50 | 88 | 95 | 5 | 610 |
| | ADC1 | | 85 | | | 603 |
| | AC4B | | 80 | | | 579 |

Working Example 13

A hydrogen generating material was produced in the same manner as Working Example 10 except that a magnesium alloy "MC10" (composition: Mg content: 94 wt %, Zn content: 4 wt %, Zr content: 0.8 wt %, form: cutting chips) based on the JIS was used instead of the aluminum alloy "ADC6". Subsequently, the amount of hydrogen generated was measured in the same manner as Working Example 1. Table 7 shows the results. The maximum reaction temperature of the hydrogen generating material including 1 wt % heat generating material was 80° C. during the test.

Working Example 14

A hydrogen generating material was produced in the same manner as Working Example 13 except that the magnesium alloy powder having an average particle size of 50 μm (the proportion of particles with a particle size of 60 μm or less: 82 wt %) was mixed with calcium oxide at a ratio as shown in Table 7. Subsequently, the amount of hydrogen generated was measured in the same manner as Working Example 1. Table 7 shows the results.

Working Example 15

Instead of the magnesium alloy "MC10", the following magnesium alloys based on the JIS were used: "MC12" (composition: Mg content: 92 wt %, Zr content: 0.8 wt %, form: cutting chips); "MDC1B" (composition: Mg content: 90 wt %, Al content: 8.5 wt %, form: cutting chips); and "MC3" (composition: Mg content: 87 wt %, Al content: 9.5 wt %, Zn content: 2 wt %, form: cutting chips). Three types of hydrogen generating materials were produced in the same manner as Working Example 14 except that each of the metal materials was mixed with calcium oxide at a ration as shown in Table 7. Subsequently, the amount of hydrogen generated was measured in the same manner as Working Example 1. Table 7 shows the results.

TABLE 7

| | Metal material | | | | |
|---|---|---|---|---|---|
| | | Average | | Content (wt %) | Amount of |
| | Material (JIS) | particle size ($\mu$m) | Mg content (wt %) | Metal material / Calcium oxide | hydrogen generated (mL) |
| Working Example 13 | MC10 | 10 | 94 | 99 / 1 | 210 |
| | | | | 97 / 3 | 251 |
| | | | | 95 / 5 | 247 |
| | | | | 90 / 10 | 264 |
| | | | | 85 / 15 | 201 |
| | | | | 80 / 20 | 168 |
| | | | | 70 / 30 | 130 |
| Working Example 14 | MC10 | 50 | 94 | 95 / 5 | 185 |
| | | | | 85 / 15 | 198 |
| | | | | 80 / 20 | 96 |
| | | | | 70 / 30 | 87 |
| Working Example 15 | MC12 | 50 | 92 | 95 / 5 | 183 |
| | MDC1B | | 90 | | 191 |
| | MC3 | | 87 | | 190 |

In Working Examples 10 to 15, the surface treatment of the metal material can be performed easily by using the aluminum alloy with high hardness or the magnesium alloy, and thus the amount of hydrogen generated can be increased.

Working Example 16

Referring to FIG. 1, the pellets formed in Working Example 5 were placed in the vessel 2 of the hydrogen generator 1 as the hydrogen generating material 9. By using the tubular pump 6, water 10 flowed through the supply pipe 7 and entered the vessel 2 from the inlet 4 so that the water 10 was supplied continuously at a rate of 0.05 mL/min. Thus, the hydrogen generating material 9 and the water 10 reacted to produce hydrogen. This hydrogen was drawn from the outlet 5 through the discharge pipe 8 and supplied to the polymer electrolyte fuel cell 20 in FIG. 2. Then, the power generation of the fuel cell 20 was measured. Consequently, the fuel cell 20 yielded a high output of 200 mW/cm$^2$ at room temperature, which ensures that the hydrogen functions sufficiently as a fuel source for driving the fuel cell.

In this example, when the supply of water with the tubular pump 6 stopped, the hydrogen generation stopped after several minutes. Therefore, the amount of hydrogen generated can be controlled by controlling the supply of water.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

INDUSTRIAL APPLICABILITY

As described above, the hydrogen generating material of the present invention can produce hydrogen easily and efficiently at low temperatures. A hydrogen generator can be made portable by using the hydrogen generating material of the present invention. Moreover, the use of the hydrogen generating material of the present invention as a hydrogen fuel source can reduce the size of a fuel cell and improve the electrical efficiency.

The invention claimed is:

1. A hydrogen generating material that reacts with water to produce hydrogen comprising:
    at least one metal material selected from the group consisting of aluminum, magnesium, and their alloys; and
    a heat generating material that generates heat by reacting with water at room temperature,
    wherein the metal material includes particles with a particle size of 60 $\mu$m or less in a proportion of 80 wt % or more,
    the hydrogen generating material comprises at least one oxide selected from the group consisting of an oxide of an alkali metal and an oxide of an alkaline-earth metal as the heat generating material, and
    a proportion of the metal material to a total weight of the metal material and the heat generating material is more than 85 wt % and not more than 99 wt %.

2. The hydrogen generating material according to claim 1, further comprising at least one compound selected from the group consisting of calcium chloride, magnesium chloride, and calcium sulfate as the heat generating material.

3. The hydrogen generating material according to claim 1, further comprising calcium oxide as the heat generating material.

4. The hydrogen generating material according to claim 1, wherein the metal material is aluminum or an aluminum alloy.

5. The hydrogen generating material according to claim 1, wherein the metal material is an aluminum alloy, and
    the aluminum alloy includes an element other than aluminum in a proportion of 2 to 20 wt %.

6. The hydrogen generating material according to claim 1, wherein the metal material is a magnesium alloy, and
    the magnesium alloy includes an element other than magnesium in a proportion of 2 to 20 wt %.

7. The hydrogen generating material according to claim 5, wherein the aluminum alloy includes at least one element selected from the group consisting of silicon, iron, copper, manganese, magnesium, zinc, nickel, titanium, lead, tin, and chromium.

8. The hydrogen generating material according to claim 6, wherein the magnesium alloy includes at least one element selected from the group consisting of aluminum, zinc, zirconium, silicon, iron, copper, manganese, nickel, and a rare-earth element.

9. The hydrogen generating material according to claim 1, wherein the metal material has a particle size of 0.1 $\mu$m or more.

10. The hydrogen generating material according to claim 1, wherein the metal material has an average particle size of 30 $\mu$m or less.

11. The hydrogen generating material according to claim 1, wherein the metal material is powder produced by an atomizing method.

12. The hydrogen generating material according to claim 1, wherein the metal material is subjected to surface treatment that improves surface reactivity by a chemical or mechanical means.

13. The hydrogen generating material according to claim 12, wherein the surface treatment is performed by mechanically stirring the metal material in a solvent.

14. The hydrogen generating material according to claim 1, being in the form of pellets or granules.

15. The hydrogen generating material according to claim 1, wherein the metal material is in the form of a scale.

16. A hydrogen generator for generating hydrogen using a hydrogen generating material that reacts with water to produce hydrogen, comprising:

a vessel having at least an outlet through which hydrogen is discharged, wherein the hydrogen generating material according to claim 1 is placed in the vessel.

17. The hydrogen generator according to claim 16, wherein the vessel has an inlet through which water is supplied.

18. The hydrogen generator according to claim 16, wherein the vessel has a storage portion for storing water inside.

19. A fuel cell comprising:

a membrane electrode assembly that comprises a positive electrode for reducing oxygen, a negative electrode for oxidizing hydrogen, and a solid electrolyte located between the positive electrode and the negative electrode; and the hydrogen generator according to claim 16, wherein hydrogen produced by the hydrogen generator is used as a fuel source.

20. A method for producing hydrogen comprising:

supplying water to the hydrogen generating material according to claim 1; and producing hydrogen by a reaction of the water and the metal material included in the hydrogen generating material.

21. A hydrogen generating material that reacts with water to produce hydrogen comprising:

at least one metal material selected from the group consisting of aluminum, magnesium, and their alloys; and a heat generating material that generates heat by reacting with water at room temperature, wherein a particle size of the metal material is 100 μm or less, the hydrogen generating material comprises at least one oxide selected from the group consisting of an oxide of an alkali metal and an oxide of an alkaline-earth metal as the heat generating material, and a proportion of the heat generating material to the whole hydrogen generating material is 1 wt % to 20 wt %.

* * * * *